US012070072B2

(12) United States Patent
Kim et al.

(10) Patent No.: US 12,070,072 B2
(45) Date of Patent: Aug. 27, 2024

(54) APPARATUS FOR GENERATING AEROSOL COMPRISING MULTILAYER THERMALLY CONDUCTIVE MEMBER

(71) Applicant: KT&G CORPORATION, Daejeon (KR)

(72) Inventors: Dong Sung Kim, Seoul (KR); Heon Jun Jeong, Seoul (KR); Won Kyeong Lee, Gyeonggi-do (KR); Jae Sung Choi, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 565 days.

(21) Appl. No.: 17/299,158

(22) PCT Filed: Apr. 6, 2021

(86) PCT No.: PCT/KR2021/004276
§ 371 (c)(1),
(2) Date: Jun. 2, 2021

(87) PCT Pub. No.: WO2021/225288
PCT Pub. Date: Nov. 11, 2021

(65) Prior Publication Data

US 2023/0346029 A1 Nov. 2, 2023

(30) Foreign Application Priority Data

May 7, 2020 (KR) ........................ 10-2020-0054783
Jun. 19, 2020 (KR) ........................ 10-2020-0074953

(51) Int. Cl.
*A24F 40/465* (2020.01)
*A24F 40/20* (2020.01)
*H05B 6/10* (2006.01)

(52) U.S. Cl.
CPC ............ *A24F 40/465* (2020.01); *A24F 40/20* (2020.01); *H05B 6/105* (2013.01)

(58) Field of Classification Search
CPC ........ A24F 40/465; A24F 40/20; A24F 40/46; A24F 40/40; A24F 40/50; A24F 40/51; H05B 6/105; H05B 6/36; H01M 2220/30
See application file for complete search history.

(56) References Cited

U.S. PATENT DOCUMENTS 9,930,915 B2 4/2018 Worm et al.
10,117,459 B2 11/2018 Lavanchy et al.
(Continued)

FOREIGN PATENT DOCUMENTS

CA 3154400 A1 * 5/2021 ............... A24D 1/20
CN 107148224 A 9/2017
(Continued)

OTHER PUBLICATIONS

Extended European Search Report dated Feb. 15, 2022, issued in European Application No. 21720158.1.
(Continued)

*Primary Examiner* — Jean F Duverne
(74) *Attorney, Agent, or Firm* — Sughrue Mion, PLLC

(57) ABSTRACT

An aerosol generating device includes a multilayered thermally conductive member forming an accommodation space into which an aerosol generating article is configured to be inserted; a heater surrounding the multilayered thermally conductive member; a battery configured to supply power to the heater; and a controller configured to control power supplied from the battery to the heater such that the multilayered thermally conductive member transfers heat from the heater to the aerosol generating article. Each layer of the multilayered thermally conductive member includes a corrosion-resistant material or a thermally conductive material.

16 Claims, 17 Drawing Sheets

(56) References Cited

U.S. PATENT DOCUMENTS

| | | | |
|---|---|---|---|
| 2007/0283972 | A1 | 12/2007 | Monsees et al. |
| 2017/0055580 | A1 | 3/2017 | Blandino et al. |
| 2017/0188629 | A1 | 7/2017 | Dickens et al. |
| 2017/0238609 | A1 | 8/2017 | Schlipf |
| 2018/0352857 | A1 | 12/2018 | Karles et al. |
| 2018/0360111 | A1 | 12/2018 | Lavanchy et al. |
| 2019/0124985 | A1 | 5/2019 | Wu et al. |
| 2020/0054068 | A1 | 2/2020 | Blandino et al. |
| 2020/0093179 | A1 | 3/2020 | Rossoll et al. |
| 2020/0281273 | A1 | 9/2020 | Kim et al. |
| 2020/0359696 | A1 | 11/2020 | Lim |
| 2021/0045448 | A1 | 2/2021 | Yamada et al. |
| 2021/0106051 | A1 | 4/2021 | Han et al. |

FOREIGN PATENT DOCUMENTS

| | | | |
|---|---|---|---|
| CN | 110574972 | A | 12/2019 |
| CN | 110944529 | A | 3/2020 |
| CN | 111065285 | A | 4/2020 |
| KR | 10-2018-0033295 | A | 4/2018 |
| KR | 10-1892886 | B1 | 8/2018 |
| KR | 10-1927134 | B1 | 12/2018 |
| KR | 10-2019-0035949 | A | 4/2019 |
| KR | 10-2019-0131104 | A | 11/2019 |
| KR | 10-2057216 | B1 | 12/2019 |
| WO | 2016/023177 | A1 | 2/2016 |
| WO | 2019/088588 | A2 | 5/2019 |
| WO | 2019/208536 | A1 | 10/2019 |
| WO | 2019/224380 | A1 | 11/2019 |

OTHER PUBLICATIONS

Office Action issued Aug. 30, 2022 in Japanese Application No. 2021-536800.

Office action issued Sep. 27, 2022 in Korean Application No. 10-2020-0074953.

Chinese Office Action dated Mar. 31, 2023 in Chinese Application No. 202180001731.6.

International Search Report dated Aug. 11, 2021 from the International Searching Authority in International Application No. PCT/KR2021/004276.

* cited by examiner

FIG. 9A

| TIME(s) | MULTILAYERED THERMALLY CONDUCTIVE MEMBER(A) | STS 301(B) | TIME(s) | MULTILAYERED THERMALLY CONDUCTIVE MEMBER(A) | STS 301(B) |
|---|---|---|---|---|---|
| 3.5 | 100 | 100 | 7.3 | 156.6 | 148.1 |
| 3.6 | 100 | 100 | 7.4 | 158 | 149.3 |
| 3.7 | 100.2 | 100 | 7.5 | 159.4 | 150.5 |
| 3.8 | 102.3 | 100.1 | 7.6 | 160.6 | 151.8 |
| 3.9 | 104.7 | 101.3 | 7.7 | 161.8 | 152.8 |
| 4 | 106.8 | 102.7 | 7.8 | 162.8 | 154.2 |
| 4.1 | 106.6 | 103.1 | 7.9 | 164.2 | 155.3 |
| 4.2 | 108.4 | 104.9 | 8 | 166.1 | 156.3 |
| 4.3 | 110.2 | 106.7 | 8.1 | 166.3 | 156.7 |
| 4.4 | 115.5 | 109.3 | 8.2 | 167.8 | 157.3 |
| 4.5 | 116.1 | 110.8 | 8.3 | 168.8 | 158.7 |
| 4.6 | 118.8 | 112.6 | 8.4 | 168.8 | 159.8 |
| 4.7 | 119.6 | 114.6 | 8.5 | 171 | 160.8 |
| 4.8 | 122.5 | 115.9 | 8.6 | 172.2 | 161.7 |
| 4.9 | 123.5 | 117.5 | 8.7 | 173.4 | 163 |
| 5 | 125.6 | 118.4 | 8.8 | 174.4 | 164 |
| 5.1 | 125.8 | 118.4 | 8.9 | 175.5 | 165.2 |
| 5.2 | 127 | 121.3 | 9 | 176.4 | 166.2 |
| 5.3 | 129 | 122.8 | 9.1 | 176.9 | 167.2 |
| 5.4 | 130.8 | 124.1 | 9.2 | 177.8 | 168.2 |
| 5.5 | 132.2 | 126.1 | 9.3 | 178.8 | 169.3 |
| 5.6 | 133.7 | 127.2 | 9.4 | 179.8 | 170.4 |
| 5.7 | 135.6 | 129.1 | 9.5 | 180.9 | 171.3 |
| 5.8 | 136.7 | 130.5 | 9.6 | 182 | 172.2 |
| 5.9 | 138.6 | 131.7 | 9.7 | 182.9 | 172.2 |
| 6 | 140.1 | 132.9 | 9.8 | 183.9 | 174.5 |
| 6.1 | 141.6 | 132.9 | 9.9 | 184.9 | 175.2 |
| 6.2 | 143.1 | 134.7 | 10 | 185.8 | 175.4 |
| 6.3 | 144.7 | 136.4 | 10.1 | 186.2 | 176.1 |
| 6.4 | 145.8 | 137.5 | 10.2 | 186.8 | 177.1 |
| 6.5 | 147.3 | 138.9 | 10.3 | 188 | 178 |
| 6.6 | 148.8 | 140.1 | 10.4 | 188.9 | 178.9 |
| 6.7 | 150.1 | 141.4 | 10.5 | 189.8 | 178.9 |
| 6.8 | 150.1 | 143 | 10.6 | 190.7 | 180.7 |
| 6.9 | 152.9 | 144.4 | 10.7 | 191.6 | 181.7 |
| 7 | 153.5 | 144.4 | 10.8 | 192.5 | 182.5 |
| 7.1 | 154.1 | 145.4 | 10.9 | 193.5 | 183.4 |
| 7.2 | 155.4 | 146.7 | | | |

FIG. 9B

| TIME(s) | MULTILAYERED THERMALLY CONDUCTIVE MEMBER(A) | STS 301(B) | TIME(s) | MULTILAYERED THERMALLY CONDUCTIVE MEMBER(A) | STS 301(B) |
|---|---|---|---|---|---|
| 11 | 193.5 | 183.8 | 15 | 224.7 | 210.4 |
| 11.1 | 195.3 | 184.3 | 15.1 | 224.9 | 211.1 |
| 11.2 | 196.2 | 185.2 | 15.2 | 225.5 | 211.6 |
| 11.3 | 197 | 186 | 15.3 | 226.1 | 212.2 |
| 11.4 | 199 | 186.8 | 15.4 | 226.7 | 212.8 |
| 11.5 | 199.8 | 187.6 | 15.5 | 227.3 | 213.4 |
| 11.6 | 200.6 | 188.6 | 15.6 | 227.9 | 214 |
| 11.7 | 201.4 | 189.4 | 15.7 | 228.6 | 214.7 |
| 11.8 | 202.3 | 190.2 | 15.8 | 229.2 | 215.3 |
| 11.9 | 203.1 | 191 | 15.9 | 229.8 | 215.3 |
| 12 | 203.6 | 191.3 | 16 | 230.4 | 216.5 |
| 12.1 | 204 | 191.8 | 16.1 | 230.6 | 216.5 |
| 12.2 | 204.8 | 192.5 | 16.2 | 231 | 217.1 |
| 12.3 | 205.6 | 193.3 | 16.3 | 231.6 | 217.6 |
| 12.4 | 206.4 | 194.2 | 16.4 | 232.2 | 218.2 |
| 12.5 | 207.2 | 195 | 16.5 | 232.8 | 218.8 |
| 12.6 | 208 | 195.6 | 16.6 | 233.4 | 219.3 |
| 12.7 | 208.8 | 196.5 | 16.7 | 233.9 | 220 |
| 12.8 | 209.5 | 197.1 | 16.8 | 234.5 | 220.5 |
| 12.9 | 210.3 | 198 | 16.9 | 235.1 | 221 |
| 13 | 210.7 | 198.4 | 17 | 235.6 | 221.6 |
| 13.1 | 211 | 198.7 | 17.1 | 236.2 | 221.6 |
| 13.2 | 211.8 | 198.7 | 17.2 | 236.7 | 222.7 |
| 13.3 | 212.6 | 200.2 | 17.3 | 237.2 | 223.2 |
| 13.4 | 213.3 | 200.9 | 17.4 | 237.8 | 223.8 |
| 13.5 | 214.1 | 201.6 | 17.5 | 238.4 | 224.3 |
| 13.6 | 214.9 | 202.3 | 17.6 | 238.9 | 224.8 |
| 13.7 | 215.5 | 203 | 17.7 | 238.9 | 225.3 |
| 13.8 | 216.2 | 203.7 | 17.8 | 240 | 225.8 |
| 13.9 | 217 | 204.4 | 17.9 | 240.5 | 226.3 |
| 14 | 217.5 | 204.9 | 18 | 240.6 | 226.4 |
| 14.1 | 217.7 | 205.1 | 18.1 | 241 | 226.8 |
| 14.2 | 218.4 | 205.8 | 18.2 | 241.5 | 227.4 |
| 14.3 | 219.1 | 206.4 | 18.3 | 242 | 227.9 |
| 14.4 | 219.8 | 207.1 | 18.4 | 242.5 | 228.4 |
| 14.5 | 221.4 | 207.7 | 18.5 | 243.1 | 228.4 |
| 14.6 | 222.1 | 208.4 | 18.6 | 243.6 | 229.4 |
| 14.7 | 222.8 | 209 | 18.7 | 244 | 229.9 |
| 14.8 | 223.4 | 209.7 | 18.8 | 245.5 | 230.4 |
| 14.9 | 224.1 | 210.4 | 18.9 | 246.1 | 230.9 |

FIG. 9C

| TIME(s) | MULTILAYERED THERMALLY CONDUCTIVE MEMBER(A) | STS 301(B) | TIME(s) | MULTILAYERED THERMALLY CONDUCTIVE MEMBER(A) | STS 301(B) |
|---|---|---|---|---|---|
| 19 | 246.2 | 231 | 23.2 | 262.1 | 246.8 |
| 19.1 | 246.5 | 231.3 | 23.3 | 262.5 | 247.2 |
| 19.2 | 247 | 231.8 | 23.4 | 262.8 | 247.5 |
| 19.3 | 247.4 | 232.3 | 23.5 | 263.2 | 247.9 |
| 19.4 | 247.9 | 232.7 | 23.6 | 263.5 | 248.3 |
| 19.5 | 248.4 | 233.2 | 23.7 | 263.9 | 248.7 |
| 19.6 | 248.9 | 233.7 | 23.8 | 264.2 | 249 |
| 19.7 | 249.3 | 234.1 | 23.9 | 264.6 | 249.4 |
| 19.8 | 249.8 | 234.6 | 24 | 265 | 249.7 |
| 19.9 | 250.3 | 235.1 | 24.1 | 265.3 | 249.8 |
| 20 | 250.5 | 235.2 | 24.2 | 265.7 | 250.1 |
| 20.1 | 250.7 | 235.5 | 24.3 | 266 | 250.4 |
| 20.2 | 251.2 | 235.9 | 24.4 | 266.3 | 250.7 |
| 20.3 | 251.6 | 236.4 | 24.5 | 266.7 | 251.1 |
| 20.4 | 252 | 236.8 | 24.6 | 267 | 251.4 |
| 20.5 | 252.5 | 237.2 | 24.7 | 267.3 | 251.7 |
| 20.6 | 252.9 | 237.7 | 24.8 | 267.6 | 251.7 |
| 20.7 | 253.3 | 238.1 | 24.9 | 267.9 | 252.4 |
| 20.8 | 253.7 | 238.5 | 25 | 268 | 252.7 |
| 20.9 | 254.2 | 238.9 | 25.1 | 268.3 | 253.1 |
| 21 | 254.5 | 239.2 | 25.2 | 268.6 | 253.4 |
| 21.1 | 254.6 | 239.4 | 25.3 | 268.9 | 253.7 |
| 21.2 | 255 | 239.8 | 25.4 | 269.2 | 254.1 |
| 21.3 | 255.5 | 240.2 | 25.5 | 269.5 | 254.4 |
| 21.4 | 255.9 | 240.6 | 25.6 | 269.9 | 254.7 |
| 21.5 | 256.3 | 241 | 25.7 | 270.2 | 254.7 |
| 21.6 | 256.7 | 241.4 | 25.8 | 270.5 | 255.4 |
| 21.7 | 257.1 | 241.8 | 25.9 | 270.8 | 255.7 |
| 21.8 | 257.5 | 242.2 | 26 | 271 | 255.7 |
| 21.9 | 257.9 | 242.6 | 26.1 | 271.1 | 256 |
| 22 | 258.2 | 242.9 | 26.2 | 271.4 | 256.3 |
| 22.1 | 258.3 | 243 | 26.3 | 271.7 | 256.6 |
| 22.2 | 258.6 | 243 | 26.4 | 272 | 256.9 |
| 22.3 | 259 | 243.8 | 26.5 | 272.3 | 257.2 |
| 22.4 | 259.4 | 244.2 | 26.6 | 272.6 | 257.5 |
| 22.5 | 259.8 | 244.6 | 26.7 | 272.9 | 257.8 |
| 22.6 | 260.2 | 245 | 26.8 | 273.2 | 258.1 |
| 22.7 | 260.6 | 245.4 | 26.9 | 273.5 | 258.4 |
| 22.8 | 261 | 245.7 | 27 | 273.6 | 258.5 |
| 22.9 | 261.4 | 246.1 | 27.1 | 273.8 | 258.7 |
| 23 | 261.7 | 246.4 | 27.2 | 274.1 | 259 |
| 23.1 | 261.8 | 246.5 | 27.3 | 274.3 | 259 |

APPARATUS FOR GENERATING AEROSOL COMPRISING MULTILAYER THERMALLY CONDUCTIVE MEMBER

CROSS REFERENCE TO RELATED APPLICATIONS

This application is a National Stage of International Application No. PCT/KR2021/004276 filed Apr. 6, 2021, claiming priority based on Korean Patent Application No. 10-2020-0054783 filed May 7, 2020 and Korean Patent Application No. 10-2020-0074953 filed Jun. 19, 2020.

TECHNICAL FIELD

One or more embodiments of the present disclosure relate to an aerosol generating device including a multilayered thermally conductive member.

BACKGROUND ART

Recently, the demand for alternative methods to overcome the disadvantages of traditional aerosol generating article has increased. For example, there is growing demand for an aerosol generating device which generates aerosol by heating an aerosol generating material in aerosol generating article, rather than by combusting aerosol generating article. Accordingly, researches on a heating-type aerosol generating article or a heating-type aerosol generating device have been actively conducted.

Therefore, there is a need for an aerosol generating device capable of efficiently heating an aerosol generating article and reducing heat loss.

DISCLOSURE

Technical Problem

One or more embodiments of the present disclosure provide an aerosol generating device capable of efficiently heating an aerosol generating article by increasing thermal conductivity. One or more embodiments of the present disclosure provide an aerosol generating device capable of discharging heat generated from a heater to the outside of the aerosol generating device. One or more embodiments of the present disclosure provide an aerosol generating device capable of efficiently heating an aerosol generating article.

Additional aspects will be set forth in part in the description which follows and, in part, will be apparent from the description, or may be learned by the practice of the presented embodiments.

Technical Solution

According to an aspect of the present disclosure, an aerosol generating device includes: a multilayered thermally conductive member forming an accommodation space into which an aerosol generating article is inserted; a heater surrounding the multilayered thermally conductive member; a battery configured to supply power to the heater; and a controller configured to control power supplied from the battery to the heater such that the multilayered thermally conductive member transfers heat from the heater to the aerosol generating article, wherein each layer of the multilayered thermally conductive member may include a corrosion-resistant material or a thermally conductive material.

According to another aspect of the present disclosure, an aerosol generating device includes: a heat generation member; and a multilayered thermally conductive member configured to discharge heat generated from the heat generation member to the outside of the aerosol generating device, wherein each layer of the multilayered thermally conductive member may include a corrosion-resistant material or a thermally conductive material.

Advantageous Effects

The aerosol generating device according to the present disclosure may arrange a multilayered thermally conductive member between a heater and an aerosol generating article to increase transfer of heat generated from the heater to the aerosol generating article and prevent damage to the heater.

The aerosol generating device according to the present disclosure may also discharge heat generated from a heat generation member to the outside of the aerosol generating device to prevent a particular portion of the aerosol generating device from being heated.

In addition, the aerosol generating device according to the present disclosure may include the multilayered thermally conductive member configured to serve as a susceptor in order to efficiently heat the aerosol generating article.

Embodiments of the present disclosure are not limited thereto. It is to be appreciated that other embodiments will be apparent to those skilled in the art from a consideration of the specification or practice of the present disclosure described herein.

DESCRIPTION OF DRAWINGS

FIG. 9A, FIG. 9B and FIG. 9C are tables showing temperatures of the multilayered thermally conductive member and the STS 304 over time when heat is generated from a heater.

BEST MODE

Figure 1:
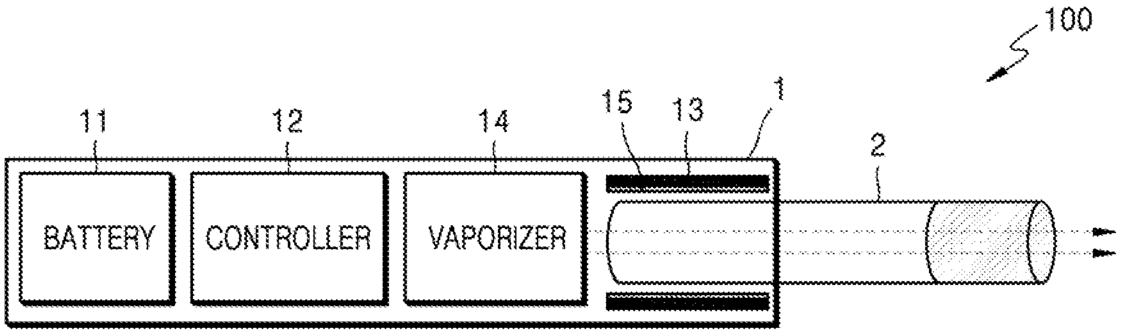
FIG. 1 is a diagram illustrating a first example in which a cigarette is inserted into an aerosol generating device.

According to one or more embodiments, an aerosol generating device is provided. The aerosol generating device includes: a multilayered thermally conductive member forming an accommodation space into which an aerosol generating article is configured to be inserted; a heater surrounding the multilayered thermally conductive member; a battery configured to supply power to the heater; and a controller configured to control power supplied from the battery to the heater such that the multilayered thermally conductive member transfers heat from the heater to the aerosol generating article, wherein each layer of the multilayered thermally conductive member comprises a corrosion-resistant material or a thermally conductive material.

According to an embodiment, the multilayered thermally conductive member comprises: a first thermally conductive layer facing the accommodation space and comprising the corrosion-resistant material; a second thermally conductive layer facing the first thermally conductive layer and comprising the thermally conductive material; and a third thermally conductive layer arranged between the second thermally conductive layer and the heater, and comprising the corrosion-resistant material.

According to an embodiment, a thickness of the multilayered thermally conductive member is within a range of 0.05 mm to 0.25 mm.

According to an embodiment, a percentage of a thickness of the first thermally conductive layer to a total thickness of the multilayered thermally conductive member has a value within a range of 15% to 25%, a percentage of a thickness of the second thermally conductive layer to the total thickness of the multilayered thermally conductive member has a value within a range of 50% to 70%, and a percentage of a thickness of the third thermally conductive layer to the total thickness of the multilayered thermally conductive member has a value within a range of 15% to 25%.

According to an embodiment, the corrosion-resistant material is stainless steel (STS) series.

According to an embodiment, the thermally conductive material comprises copper (Cu), gold (Au), silver (Ag), platinum (Pt), aluminum (Al), or an alloy thereof.

According to an embodiment, the multilayered thermally conductive member has a thermal conductivity within a range of 150 W/m·K to 300 W/m·K.

According to an embodiment, the first thermally conductive layer and the third thermally conductive layer have a thermal conductivity within a range of 10 W/m·K to 20 W/m·K, and the second thermally conductive layer has a thermal conductivity within a range of 200 W/m·K to 500 W/m·K.

According to an embodiment, the heater comprises: a susceptor; and a coil configured to form a variable magnetic field in the susceptor.

According to an embodiment, the heater comprises a coil configured to form a variable magnetic field in the multilayered thermally conductive member, and the multilayered thermally conductive member serves as a susceptor, and is configured to be heated by the variable magnetic field formed by the coil.

According to an embodiment, the aerosol generating device further includes an insulation material surrounding the heater.

According to an embodiment, the insulation material has a thermal conductivity of 0.025 W/m·K or less.

According to one or more embodiments, an aerosol generating device is provided. The aerosol generating device includes: a heat generation member; and a multilayered thermally conductive member configured to discharge heat generated from the heat generation member to an outside of the aerosol generating device, wherein each layer of the multilayered thermally conductive member comprises a corrosion-resistant material or a thermally conductive material.

According to an embodiment, the multilayered thermally conductive member comprises: a first thermally conductive layer facing the heat generation member and comprising the corrosion-resistant material; a second thermally conductive layer facing the first thermally conductive layer and comprising the thermally conductive material; and a third thermally conductive layer facing the second thermally conductive layer and comprising the corrosion-resistant material.

According to an embodiment, the heat generation member comprises a printed circuit board (PCB) or a battery.

DETAILED DESCRIPTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element is referred to as being "over," "above," "on," "below," "under," "beneath," "connected to" or "coupled to" another element, it can be directly over, above, on, below, under, beneath, connected or coupled to the other element or intervening elements may be present. In contrast, when an element is referred to as being "directly over," "directly above," "directly on," "directly below," "directly under," "directly beneath," "directly connected to" or "directly coupled to" another element, there are no intervening elements present.

In addition, unless explicitly described to the contrary, the word "comprise" and variations such as "comprises" or "comprising" will be understood to imply the inclusion of stated elements but not the exclusion of any other elements.

As used herein, terms including an ordinal number such as "first" or "second" may be used to describe various components, but the components should not be limited by the terms. The terms may be used for the purpose of distinguishing one component from other components.

In the following embodiments, a "longitudinal direction" refers to a longitudinal direction of an aerosol generating device, and a "diameter direction" refers to a short axial direction of an aerosol generating device. That is, the "diameter direction" refers to a direction perpendicular to the "longitudinal direction".

Hereinafter, example embodiments of the present disclosure will now be described more fully with reference to the accompanying drawings such that one of ordinary skill in the art may easily work the present disclosure. Embodiments of the present disclosure may, however, be embodied in many different forms and should not be construed as being limited to the example embodiments set forth herein.

Figure 2:
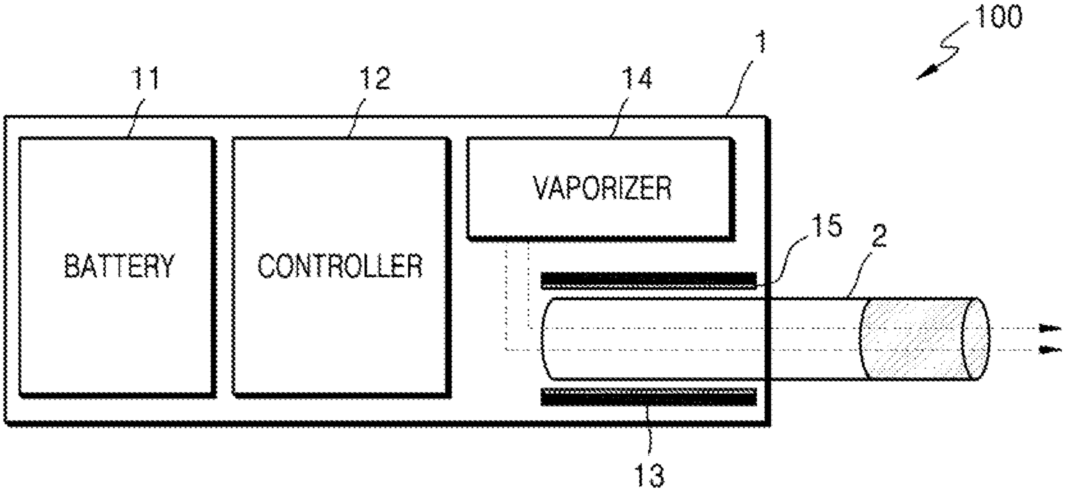
FIG. 2 is a diagram illustrating a second example in which a cigarette is inserted into an aerosol generating device.

FIGS. 1 and 2 are diagrams showing examples in which a cigarette is inserted into an aerosol generating device.

Referring to FIGS. 1 and 2, an aerosol generating system 100 includes an aerosol generating device 1 and an aerosol generating article 2 inserted into the aerosol generating device 1.

The aerosol generating device 1 includes a battery 11, a controller 12, a heater 13, a vaporizer 14, and a multilayered thermally conductive member 15. The aerosol generating article 2 may be inserted into an inner space of the aerosol generating device 1.

FIGS. 1 and 2 illustrate that the aerosol generating device 1 includes the heater 13, but the heater 13 may be omitted in some embodiments. FIGS. 1 and 2 illustrate that the aerosol generating device 1 includes the vaporizer 14, but the vaporizer 14 may be omitted in some embodiments.

FIGS. 1 and 2 illustrate some components of the aerosol generating device 1, which are related to the present embodiment. Therefore, it will be understood by one of ordinary skill in the art related to the present embodiment that general-purpose components may be further included in the aerosol generating device 1, in addition to the components illustrated in FIGS. 1 and 2.

FIG. 1 illustrates that the battery 11, the controller 12, the heater 13, and the vaporizer 14 are arranged in series. Also, FIG. 2 illustrates that the vaporizer 14 and the heater 13 are arranged in parallel. However, the internal structure of the aerosol generating device 1 is not limited to the structures illustrated in FIGS. 1 and 2. In other words, depending on a design of the aerosol generating device 1, arrangement of the battery 11, the controller 12, the heater 13, the vaporizer 14, and the multilayered thermally conductive member 15 may be changed.

When the aerosol generating article 2 is inserted into the aerosol generating device 1, the aerosol generating device 1 may operate the heater 13 and/or the vaporizer 14 to generate an aerosol. The aerosol generated by the heater 13 and/or the vaporizer 14 is delivered to a user through the aerosol generating article 2.

According to some embodiments, even when the aerosol generating article 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the aerosol generating article 2 is inserted into the aerosol generating device 1, the heater 13 may be located outside the aerosol generating article 2. Thus, the heated heater 13 may increase a temperature of an aerosol generating material in the aerosol generating article 2.

The heater 13 may be an electric resistive heater. For example, the heater 13 may include an electrically insulating substrate and an electrically conductive track, and the heater 13 may be heated as electric current flows through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. More specifically, the heater 13 may include a coil to heat an aerosol generating article in an induction heating method, and the aerosol generating article may include a susceptor capable of being heated by an induction heater. The coil may be electrically conductive and form a variable magnetic field in the susceptor.

FIGS. 1 and 2 illustrate that the heater 13 is positioned outside the aerosol generating article 2, but the position of the heater 13 is not limited thereto. For example, the heater 13 may include a cylindrical-type heating element, a tube-type heating element, a plate-type heating element, a needle-type heating element, or a rod-type heating element, and may heat the inside or the outside of the aerosol generating article 2, according to the shape of the heating element.

Also, the aerosol generating device 1 may include a plurality of the heater 13. Here, the plurality of the heater 13 may be inserted into the aerosol generating article 2 or may be arranged outside the aerosol generating article 2. Also, some of the plurality of the heater 13 may be inserted into the aerosol generating article 2 and the others may be arranged outside the aerosol generating article 2. In addition, the shape of the heater 13 is not limited to the shapes illustrated in FIGS. 1 and 2 and may include various shapes.

The vaporizer 14 may generate aerosol by heating a liquid composition and the generated aerosol may pass through the aerosol generating article 2 to be delivered to a user. In other words, the aerosol generated via the vaporizer 14 may move along an air flow passage of the aerosol generating device 1 and the air flow passage may be configured such that the aerosol generated via the vaporizer 14 passes through the aerosol generating article 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The multilayered thermally conductive member 15 may transfer heat generated from the heater 13 to the aerosol generating article 2. Each layer of the multilayered thermally conductive member 15 may include a corrosion-resistant material or a thermally conductive material. For example, the multilayered thermally conductive member 15 may include two layers or three layers, or may include three or more layers, but is not limited thereto. The multilayered thermally conductive member 15 may include a layer including a corrosion-resistant material, and a layer including a thermally conductive material.

According to an embodiment, the multilayered thermally conductive member 15 may form an accommodation space into which the aerosol generating article 2 is inserted. The multilayered thermally conductive member 15 may be surrounded by the heater 13. The controller 12 may control power supplied from the battery 11 to the heater 13 such that the multilayered thermally conductive member 15 transfers heat from the heater 13 to the aerosol generating article 2. The multilayered thermally conductive member 15 will be described later in greater detail with reference to FIG. 3.

The aerosol generating device 1 may further include general-purpose components other than the battery 11, the controller 12, the heater 13, the vaporizer 14, and the multilayered thermally conductive member 15. For example, the aerosol generating device 1 may include a display capable of outputting visual information and/or a motor for outputting haptic information. Also, the aerosol generating device 1 may include at least one sensor. Also, the aerosol generating device 1 may be formed as a structure that, even when the aerosol generating article 2 is inserted into the aerosol generating device 1, may introduce external air or discharge internal air.

Although not illustrated in FIGS. 1 and 2, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The aerosol generating article 2 may be similar to a general combustive aerosol generating article. For example, the aerosol generating article 2 may be divided into a first portion including an aerosol generating material and a second portion including a filter, etc. Alternatively, the second portion of the aerosol generating article 2 may also include an aerosol generating material. For example, an aerosol generating material made in the form of granules or capsules may be inserted into the second portion.

The first portion may be completely inserted into the aerosol generating device 1, and the second portion may be exposed to the outside. Alternatively, only a portion of the first portion may be inserted into the aerosol generating device 1, or a whole portion of the first portion and a portion of the second portion may be inserted therein. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage formed in the aerosol generating device 1 may be adjusted by the user. Accordingly, the amount of smoke and a smoking impression may be adjusted by the user. As another example, the external air may flow into the aerosol generating article 2 through at least one hole formed in a surface of the aerosol generating article 2.

Figure 3:
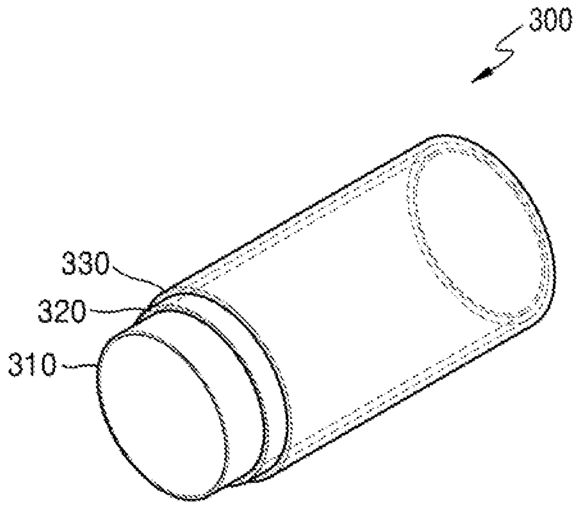
FIG. 3 is a diagram illustrating a configuration of a multilayered thermally conductive member, according to an embodiment.

FIG. 3 is a diagram illustrating a configuration of a multilayered thermally conductive member 300, according to an embodiment.

Referring to FIG. 3, the multilayered thermally conductive member 300 includes a first thermally conductive layer 310, a second thermally conductive layer 320, and a third thermally conductive layer 330. The multilayered thermally conductive member 300 of FIG. 3 corresponds to the multilayered thermally conductive member 15 illustrated in FIGS. 1 and 2. Therefore, redundant descriptions thereof will be omitted.

The multilayered thermally conductive member 300 may refer to a clad metal, ply metals, or the like. However, embodiments of the present disclosure are not limited thereto.

The first thermally conductive layer 310 of the multilayered thermally conductive member 300 may face an accommodation space into which an aerosol generating article is inserted, and may include a corrosion-resistant material. The second thermally conductive layer 320 of the multilayered thermally conductive member 300 may face the first thermally conductive layer 310 of the multilayered thermally conductive member 300, and may include a thermally conductive material. The third thermally conductive layer 330 of the multilayered thermally conductive member 300 may be arranged between the second thermally conductive layer 320 of the multilayered thermally conductive member 300 and a heater, and may include a corrosion-resistant material.

The multilayered thermally conductive member 300 and the heater may be in close contact with each other. The multilayered thermally conductive member 300 and the heater being in close contact with each other may mean that a distance between the multilayered thermally conductive member 300 and the heater is minimized.

According to an embodiment, the corrosion-resistant material included in the first thermally conductive layer 310 and the third thermally conductive layer 330 may be Stainless Steel (STS) series. In addition, the corrosion-resistant material included in the first thermally conductive layer 310 and the third thermally conductive layer 330 may include at least any one of chromium (Cr), carbon (C), iron (Fe), manganese (Mn), molybdenum (Mo), nickel (Ni), phosphorus (P), silicon (Si), and sulfur (S).

For example, the first thermally conductive layer 310 or the third thermally conductive layer 330 may include 0.1% or less C, 16% to 20% Cr, 62% to 73.5% Fe, 2% or less Mn, 1% to 2% Mo, 9% to 11.5% Ni, 0.05% or less P, 1.2% or less Si, and 0.05% or less S, but is not limited thereto.

FIG. 3 illustrates the first thermally conductive layer 310 and the third thermally conductive layer 330, but either the first thermally conductive layer 310 or the third thermally conductive layer 330 may be omitted in some embodiments.

The first thermally conductive layer 310 and the third thermally conductive layer 330 may include materials different from each other or the same material. Contents of the corrosion-resistant material included in the first thermally conductive layer 310 and the third thermally conductive layer 330 may be different from each other. For example, a percentage of components of the first thermally conductive layer 310 containing Cr relative to total components of the first thermally conductive layer 310 may be 17%, and a percentage of components of the third thermally conductive layer 330 containing Cr relative to total components of the third thermally conductive layer 330 may be 19%. Since the first thermally conductive layer 310 and the third thermally conductive layer 330 contain Cr, C, Fe, etc., corrosion resistance and oxidation resistance may be excellent, and strength may be increased. Therefore, even when the heater of the aerosol generating device is thin, damage such as wrinkles and tears of the heater may be prevented.

The second thermally conductive layer 320 of the multilayered thermally conductive member 300 may include a material having a high thermal conductivity. In addition, the second thermally conductive layer 320 may be formed of a rigid material to accommodate the aerosol generating article therein.

According to an embodiment, the thermally conductive material may include Cu, Au, Ag, Pt, Al, or an alloy thereof. However, embodiments of the present disclosure are not limited thereto. The alloy may contain 95% or more of a main metal.

According to an embodiment, the second thermally conductive layer 320 may include a plurality of layers, and each of the plurality of layers may include materials different from each other. For example, the second thermally conductive layer 320 may include a layer including Cu and a layer including Al. The second thermally conductive layer 320 may include the thermally conductive material such that heat generated from the heater is efficiently transferred to the aerosol generating article.

The multilayered thermally conductive member 300 may have a thermal conductivity within a range of 150 W/m·K to 300 W/m·K, and the second thermally conductive layer 320 may have a thermal conductivity within a range of 200 W/m·K to 500 W/m·K. In addition, the first thermally conductive layer 310 and the third thermally conductive layer 330 may have a thermal conductivity within a range of 10 W/m·K to 20 W/m·K. According to embodiments, the thermal conductivity of the first thermally conductive layer 310 or of the third thermally conductive layer 330 is 16.2 W/m·K. However, embodiments of the present disclosure are not limited thereto.

A thickness of the multilayered thermally conductive member 300 may be within a range of 0.05 mm to 0.25 mm. According to embodiments, the thickness of the multilayered thermally conductive member 300 is 0.15 mm. However, embodiments of the present disclosure are not limited thereto.

According to an embodiment, a percentage of a thickness of the first thermally conductive layer 310 to the thickness of the multilayered thermally conductive member 300 may have a value within a range of 15% to 25%, a percentage of a thickness of the second thermally conductive layer 320 to the thickness of the multilayered thermally conductive member 300 may have a value within a range of 50% to 70%, and a percentage of a thickness of the third thermally conductive layer 330 to the thickness of the multilayered thermally conductive member 300 may have a value within a range of 15% to 25%. For example, when the thickness of the multilayered thermally conductive member 300 is 0.15 mm, the thickness of the first thermally conductive layer 310 may be 0.0225 mm, the thickness of the second thermally conductive layer 320 may be 0.105 mm, and the thickness of the third thermally conductive layer 330 may be 0.0225 mm. However, embodiments of the present disclosure are not limited thereto.

The thickness of the first thermally conductive layer 310 and the thickness of the third thermally conductive layer 330 may be different from each other. For example, when the thickness of the multilayered thermally conductive member 300 is 0.15 mm, the thickness of the first thermally conductive layer 310 may be 0.0225 mm, the thickness of the second thermally conductive layer 320 may be 0.09 mm, and the thickness of the third thermally conductive layer 330 may be 0.0375 mm. However, embodiments of the present disclosure are not limited thereto The multilayered thermally conductive member 300 may form an accommodation space into which the aerosol generating article is inserted, and may have various shapes.

Figure 4:
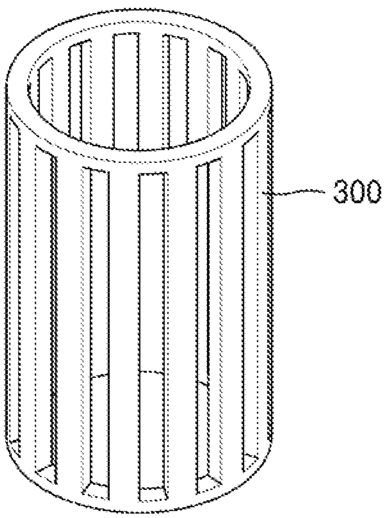
FIG. 4 is a diagram illustrating a first example of a shape of a multilayered thermally conductive member.
Figure 5:
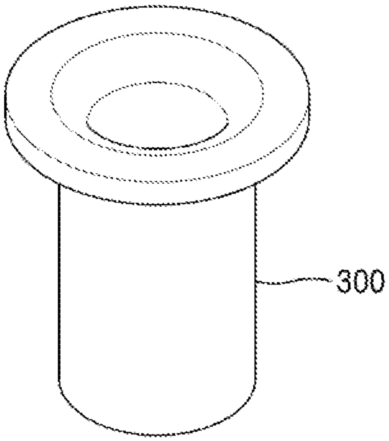
FIG. 5 is a diagram illustrating a second example of a shape of a multilayered thermally conductive member.

For example, as illustrated in FIG. 3, the multilayered thermally conductive member 300 may be formed in a tube shape including a hollow therein, and a cross section of the hollow within the multilayered thermally conductive member 300 may be polygonal. The multilayered thermally conductive member 300 may have various sizes and shapes according to a shape of the aerosol generating article. In addition, as illustrated in FIG. 4, the multilayered thermally conductive member 300 may be formed in a shape of a grate spaced apart at any suitable interval. As illustrated in FIG. 5, the multilayered thermally conductive member 300 may be formed in a shape of a flange in which a diameter of an upper surface is larger than a diameter of a lower surface, based on a direction in which the aerosol generating article is inserted. However, embodiments of the present disclosure are not limited thereto.

FIG. 3 illustrates that lengths of each of the first thermally conductive layer 310, the second thermally conductive layer 320, and the third thermally conductive layer 330 of the multilayered thermally conductive member 300 become increasingly shorter in a listed order, to easily recognize a structure of the multilayered thermally conductive member 300. However, each of the first thermally conductive layer 310, the second thermally conductive layer 320, and the third thermally conductive layer 330 may have any suitable length.

The multilayered thermally conductive member 300 includes the first thermally conductive layer 310 and the third thermally conductive layer 330 having excellent corrosion resistance and strength and the second thermally conductive layer 320 having an excellent thermal conductivity such that heat generated from the heater is efficiently transferred to the aerosol generating article. In addition, since the multilayered thermally conductive member 300 is arranged between the heater and the aerosol generating article, damage to the heater may be prevented.

Figure 6:
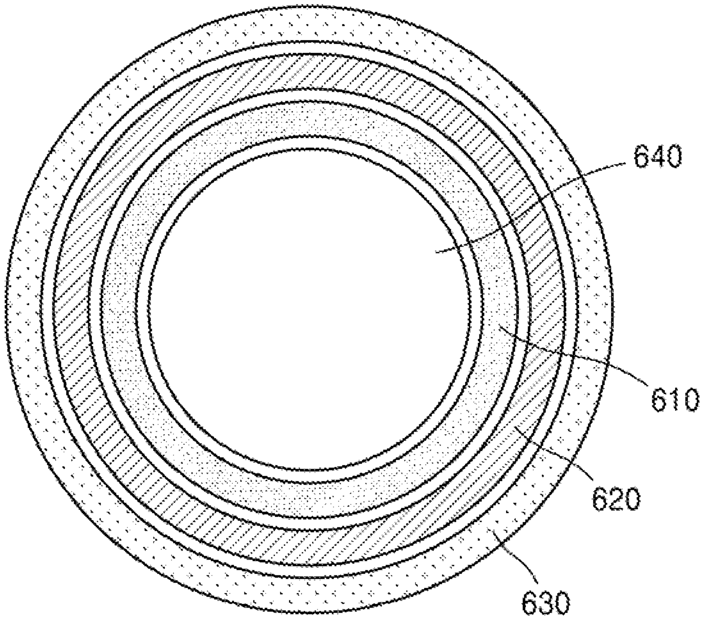
FIG. 6 is a sectional view in a radial direction of an aerosol generating device, according to an embodiment.
Figure 7:
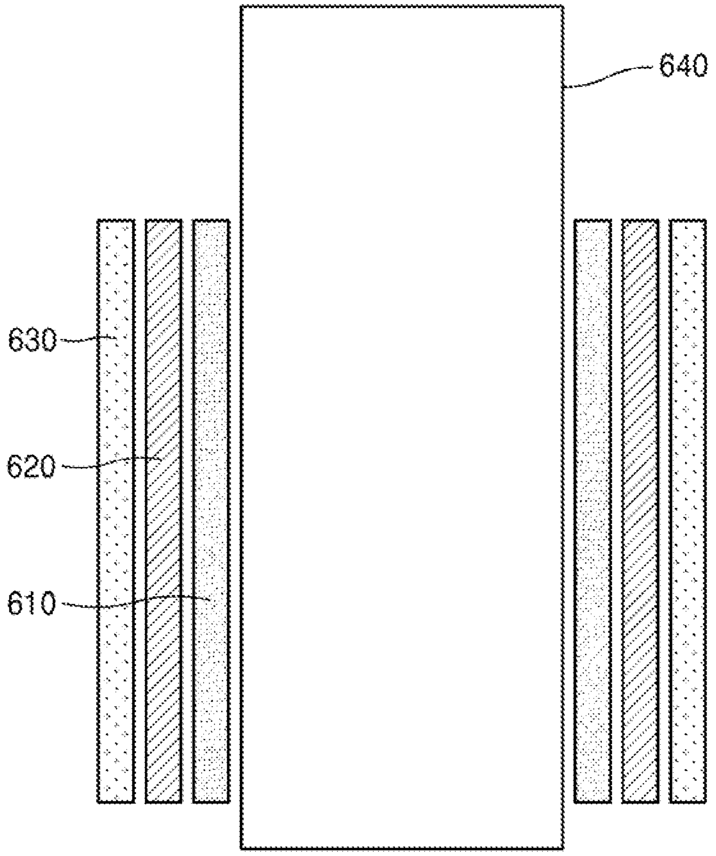
FIG. 7 is a sectional view in a lengthwise direction of an aerosol generating device, according to an embodiment.

FIG. 6 is a sectional view in a radial direction of an aerosol generating device, according to an embodiment, and FIG. 7 is a sectional view in a lengthwise direction of an aerosol generating device, according to an embodiment.

Referring to FIGS. 6 and 7, the aerosol generating device may include a multilayered thermally conductive member 610 and a heater 620, and may further include an insulation material 630. The heater 620 and an aerosol generating article 640 of FIG. 6 correspond to the heater 13 and the aerosol generating article 2 of FIGS. 1 and 2, and the multilayered thermally conductive member 610 of FIG. 6 corresponds to the multilayered thermally conductive member 300 of FIG. 3. Therefore, redundant descriptions thereof will be omitted.

The insulation material 630 may be made of an insulation material to prevent heat generated from the heater 620 from being lost to the outside. The insulation material 630 may include at least one of aerogel, vacuum insulation, silicone foam material, rubber material, filler, nylon, fleece, non-woven material, textile material, polystyrene, polyester, polyester filament, corrugated material, polypropylene, a mixture of polyester and polypropylene, and cellulose acetate.

An air layer may be included between the heater 620 and the insulation material 630. The air layer may refer to a gap between the heater 620 and the insulation material 630, or may be omitted in some embodiments.

According to an embodiment, the insulation material 630 may be aerogel. Aerogel may be obtained by replacing liquid with gas without causing shrinkage from a gel structure, and aerogel may be made from various materials such as silica, Al, Cr, tin (Sn), and the like.

According to an embodiment, the insulation material 630 may have a thermal conductivity of 0.25 W/m·K or less. According to embodiments, the thermal conductivity of the insulation material 630 is 0.004 W/m·K to 0.25 W/m·K According to an embodiment, the multilayered thermally conductive member 610 may be arranged to surround the aerosol generating article 640, the heater 620 may be arranged to surround the multilayered thermally conductive member 610, and the insulation material 630 may be arranged to surround the heater 620. That is, the aerosol generating article 640, the multilayered thermally conductive member 610, the heater 620, and the insulation material 630 may be arranged in that order. Therefore, heat generated from the heater 620 may be efficiently transferred to the aerosol generating article 640, and the heat generated from the heater 620 may not be lost to the outside.

Figure 8:
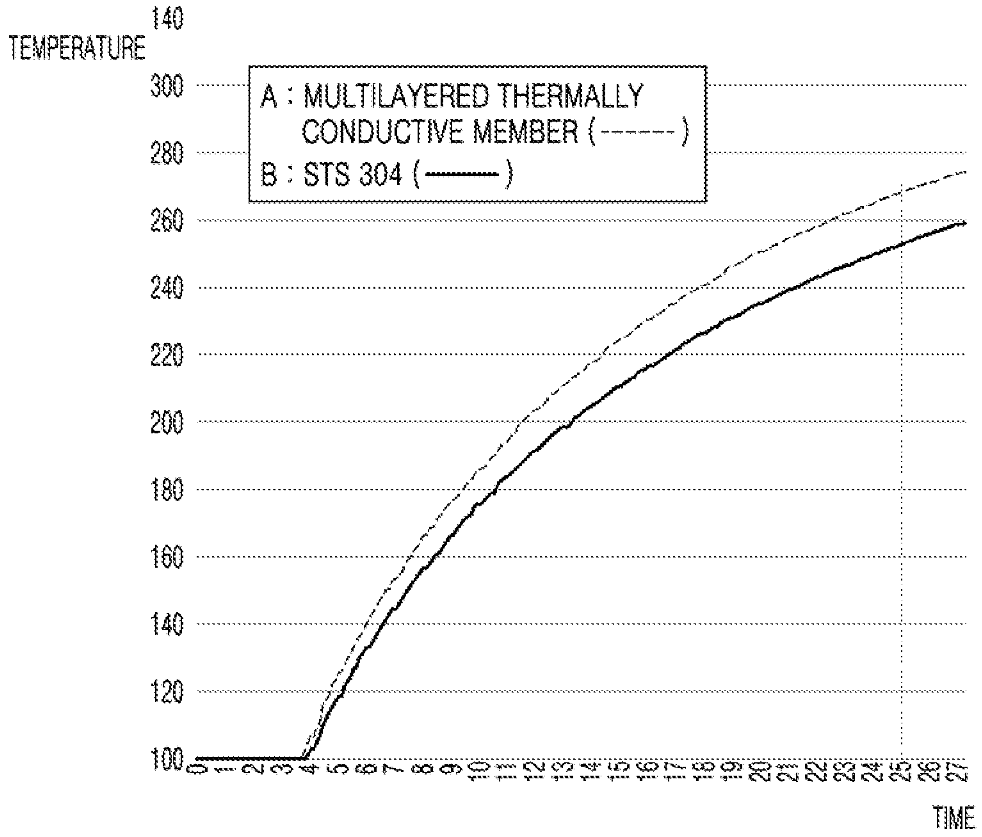
FIG. 8 is a graph showing temperatures of a multilayered thermally conductive member and a stainless steel (STS) 304 over time when heat is generated from a heater.

FIG. 8 is a graph showing temperatures of a multilayered thermally conductive member A and a STS 304 B over time when heat is generated from a heater. The multilayered thermally conductive member A of FIG. 8 corresponds to the multilayered thermally conductive member 300 of FIG. 3. Therefore, redundant descriptions thereof will be omitted.

Referring to FIG. 8, a temperature of the multilayered thermally conductive member A when the multilayered thermally conductive member A is used within an aerosol generating device, and a temperature of the STS 304 B when the STS 304 B, instead of the multilayered thermally conductive member A, is used within the aerosol generating device may be compared with each other. A horizontal axis of the graph of FIG. 8 represents a heating time (sec) of the heater, and a vertical axis of the graph of FIG. 8 represents a temperature (° C.) measured from the multilayered thermally conductive member A or the STS 304 B when heat generated from the heater is applied to the multilayered thermally conductive member A or the STS 304 B.

The STS 304 B is a STS containing Ni. It may be identified that according to the graph of FIG. 8, when the heater of the aerosol generating device is heated, a temperature of the multilayered thermally conductive member A is higher than a temperature of the STS 304 B at the same heating time. For example, when a time is 25 sec, the temperature of the multilayered thermally conductive member A is 268° C., and the temperature of the STS 304 B is 252.7° C., in which case a temperature difference between the multilayered thermally conductive member A and the STS 304 B is 15.3° C.

Since the temperature of the multilayered thermally conductive member A is higher than that of the STS 304 B at the same time (sec), the multilayered thermally conductive member A may transfer heat generated from the heater to an aerosol generating article more efficiently than the STS 304 B.

FIG. 9A, FIG. 9B and FIG. 9C are tables showing temperatures of the multilayered thermally conductive member A and the STS 304 B over time when heat is generated from a heater. Hereinafter, for convenience, FIG. 9A, FIG. 9B and FIG. 9C are referred to as FIG. 9. The multilayered thermally conductive member A of FIG. 9 corresponds to the multilayered thermally conductive member 300 of FIG. 3. Therefore, redundant descriptions thereof will be omitted.

Referring to FIG. 9, a temperature of the multilayered thermally conductive member A when the multilayered thermally conductive member A is used within an aerosol generating device, and a temperature of the STS 304 B when the STS 304 B, instead of the multilayered thermally conductive member A, is used within the aerosol generating device may be compared with each other. The tables of FIG. 9 show temperatures of the multilayered thermally conductive member A and the STS 304 B with respect to a heating time of the heater from 3.5 seconds to 27.3 seconds in units of 0.1 seconds. The STS 304 B is a STS containing Ni.

A time (sec) in the tables of FIG. 9 represents a time for which the heater of the aerosol generating device is heated. The tables of FIG. 9 represent temperatures (° C.) measured from the multilayered thermally conductive member A or the STS 304 B when heat generated from the heater is applied to the multilayered thermally conductive member A or the STS 304 B.

It may be identified that according to the tables of FIG. 9, a temperature of the multilayered thermally conductive member A and a temperature of the STS 304 B are equal to each other as 100° C. until 3.6 seconds, but the temperature of the multilayered thermally conductive member A and the temperature of the STS 304 B become different from each other from 3.7 seconds. It may be identified that the temperature of the multilayered thermally conductive member A is constantly higher than the temperature of the STS 304 B from 3.7 seconds. According to the tables of FIG. 9, at 5 seconds, the temperature of the multilayered thermally conductive member A is 125.6° C. and the temperature of the STS 304 B is 118.4° C., at 10 seconds, the temperature of the multilayered thermally conductive member A is 185.8° C. and the temperature of the STS 304 B is 175.4° C., at 15 seconds, the temperature of the multilayered thermally conductive member A is 224.7° C. and the temperature of the STS 304 B is 210.4° C., at 20 seconds, the temperature of the multilayered thermally conductive member A is 250.5° C. and the temperature of the STS 304 B is 235.2° C., and at 25 seconds, the temperature of the multilayered thermally conductive member A is 268° C. and the temperature of the STS 304 B is 252.7° C.

The temperature of the multilayered thermally conductive member A is higher than that of the STS 304 B at the same time (sec). Therefore, a thermal conductivity of the multilayered thermally conductive member A is higher than that of the STS 304 B. Therefore, the aerosol generating device may increase a heating efficiency of an aerosol generating article more when using the multilayered thermally conductive member A rather than the STS 304 B.

In addition, it may be identified that according to the tables of FIG. 9, when the temperature of the multilayered thermally conductive member A and the temperature of the STS 304 B are the same, a time for which the heater is heated when the multilayered thermally conductive member A is used is shorter than a time for which the heater is heated when the STS 304 B is used. For example, in the case of 259° C., whereas the heating time of the heater when the multilayered thermally conductive member A is used is 22.3 seconds, the heating time of the heater when the STS 304 B is used is 27.2 seconds.

The heating time of the heater when the multilayered thermally conductive member A is used is shorter than the heating time of the heater when the STS 304 B is used at the same temperature. Therefore, the thermal conductivity of the multilayered thermally conductive member A is higher than that of the STS 304 B. Therefore, the aerosol generating device may increase the heating efficiency of the aerosol generating article more when using the multilayered thermally conductive member A rather than the STS 304 B.

Figure 10:
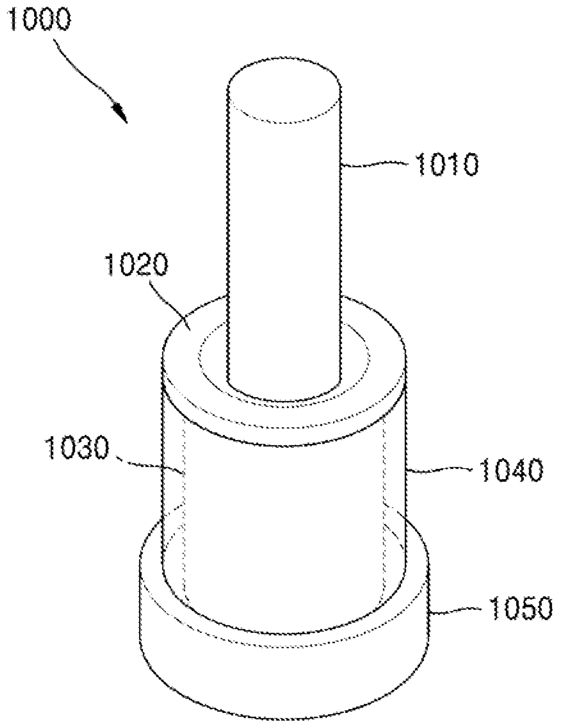
FIG. 10 is a diagram illustrating a configuration of a heater assembly of an aerosol generating device, according to an embodiment.
Figure 11:
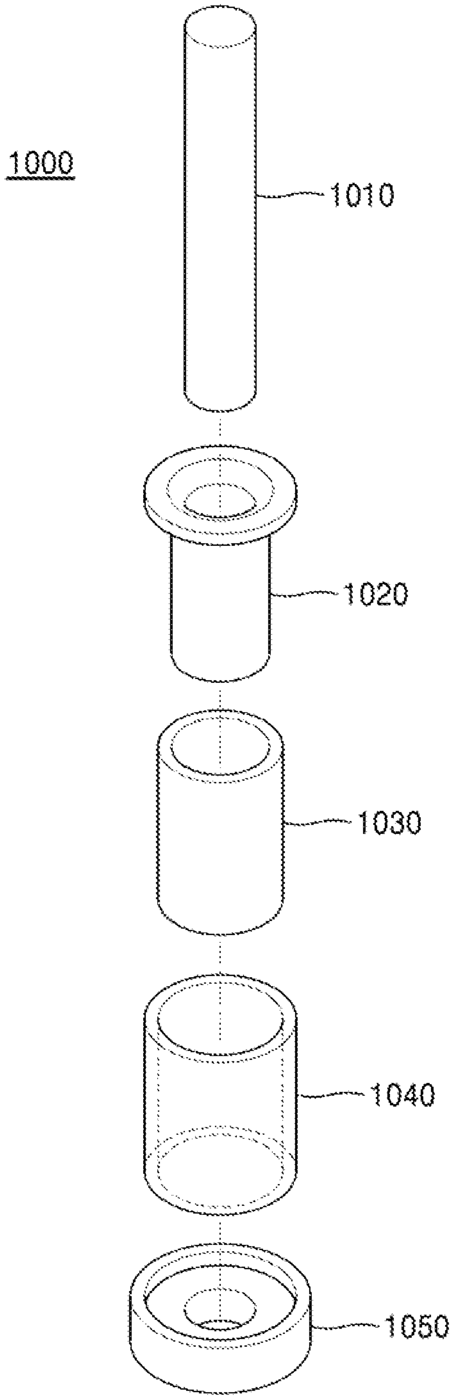
FIG. 11 is an exploded view of the heater assembly of the aerosol generating device according to FIG. 10.

FIG. 10 is a diagram illustrating a configuration of a heater assembly of an aerosol generating device, according to an embodiment, and FIG. 11 is an exploded view of the heater assembly of the aerosol generating device according to FIG. 10.

Referring to FIGS. 10 and 11, a heater assembly 1000 of the aerosol generating device may include a multilayered thermally conductive member 1020 and a heater 1030. An aerosol generating article 1010 and the heater 1030 of FIGS. 10 and 11 correspond to the aerosol generating article 2 and the heater 13 of FIGS. 1 and 2, the multilayered thermally conductive member 1020 of FIGS. 10 and 11 corresponds to the multilayered thermally conductive member 300 of FIG. 3, and an insulation material 1040 of FIGS. 10 and 11 corresponds to the insulation material 630 of FIGS. 6 and 7. Therefore, redundant descriptions thereof will be omitted.

In the heater assembly 1000 of the aerosol generating device illustrated in FIGS. 10 and 11, some components related to the present embodiment are illustrated. Therefore, those of ordinary skill in the art related to the present embodiment will understand that general-purpose components other than the components shown in FIGS. 10 and 11 may be further included in the heater assembly 1000 of the aerosol generating device. For example, the heater assembly 1000 may include at least one electric connector (not shown) for electrical connection between the heater 1030 and a battery.

The heater assembly 1000 of the aerosol generating device may include the multilayered thermally conductive member 1020 forming an accommodation space into which the aerosol generating article 1010 is inserted, and the heater 1030 surrounding the multilayered thermally conductive member 1020. Each layer of the multilayered thermally conductive member 1020 may include a corrosion-resistant material or a thermally conductive material. The multilayered thermally conductive member 1020 may include a first thermally conductive layer facing the accommodation space into which the aerosol generating article 1010 is inserted and including a corrosion-resistant material, a second thermally conductive layer facing the first thermally conductive layer and including a thermally conductive material, and a third thermally conductive layer arranged between the second thermally conductive layer and the heater 1030, and including a corrosion-resistant material.

According to an embodiment, the heater assembly 1000 of the aerosol generating device may further include the insulation material 1040. The insulation material 1040 may include aerogel, and may be arranged to surround the heater 1030 to prevent heat generated from the heater 1030 from being lost to the outside.

According to an embodiment, the heater assembly 1000 of the aerosol generating device may further include a support member 1050. The support member 1050 may refer to a bracket capable of fixing at least one of the multilayered thermally conductive member 1020, the heater 1030, and the insulation material 1040. The multilayered thermally conductive member 1020, the heater 1030, and the insulation material 1040 may be mounted on and fixed in a groove of the support member 1050.

The support member 1050 may be made of a heat-resistant material, and the heat-resistant material may include a material capable of withstanding heat of 250° C. or higher. Withstanding of heat of 250° C. or higher refers to that a melting point (Tm) of the heat-resistant material is 250° C. or higher.

The heat-resistant material may be a heat-resistant synthetic resin. When the heat-resistant material is a heat-resistant synthetic resin, at least one of the melting point and a glass transition temperature (Tg) of the heat-resistant material may be 250° C. or higher.

For example, the heat-resistant material may include at least one of polypropylene, polyether ether ketone (PEEK), polyethylene, polypropylene, polyethylene terephthalate, polycyclohexylenedimethylene terephthalate, polyimide, sulfone-based resin, fluorine-based resin, and aramid. The sulfone-based resin may include a resin such as polyethylsulfone and polyphenylene sulfide, and the fluorine-based resin may include polytetrafluoroethylene (Teflon).

However, embodiments of the present disclosure are not limited thereto. As an example, the heat-resistant material may be any suitable material capable of withstanding heat of 200° C. or higher, or the heat-resistant material may be any suitable material capable of withstanding heat of 250° C. or higher. Alternatively, the heat-resistant material may be any suitable material capable of withstanding heat of 300° C. or higher, or the heat-resistant material may be any suitable material capable of withstanding heat of 400° C. or higher.

The heater assembly 1000 of the aerosol generating device according to the present disclosure includes the multilayered thermally conductive member 1020, the heater 1030, the insulation material 1040 and/or the support member 1050, and thus heat generated from the heater 1030 may be efficiently transferred to the aerosol generating article 1010, heat generated from the heater 1030 may be effectively prevented from being lost to the outside of the aerosol generating device, and the multilayered thermally conductive member 1020, the heater 1030, and the insulation material 1040 may be firmly fixed so as not to move.

Figure 12:
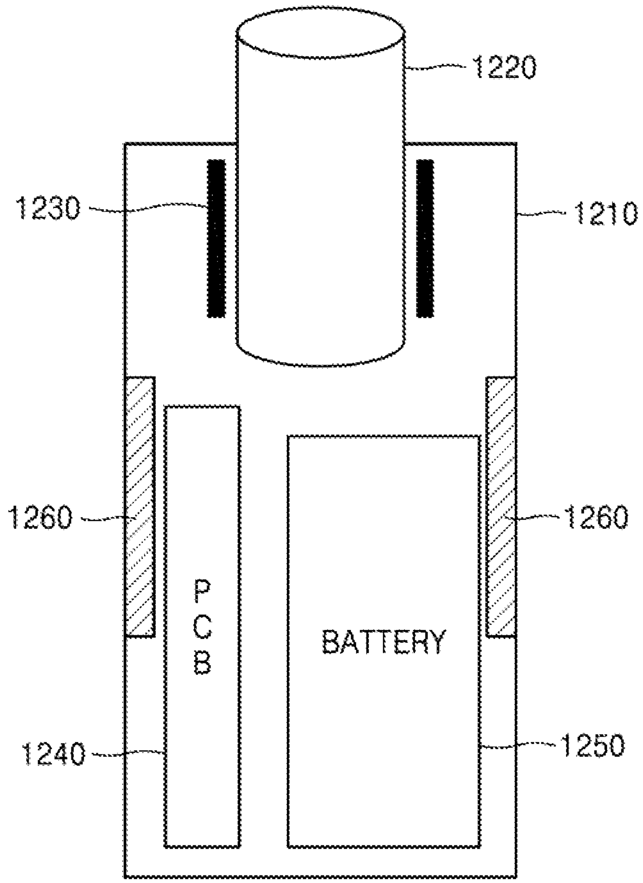
FIG. 12 is a first example view illustrating a position of a multilayered thermally conductive member.
Figure 13:
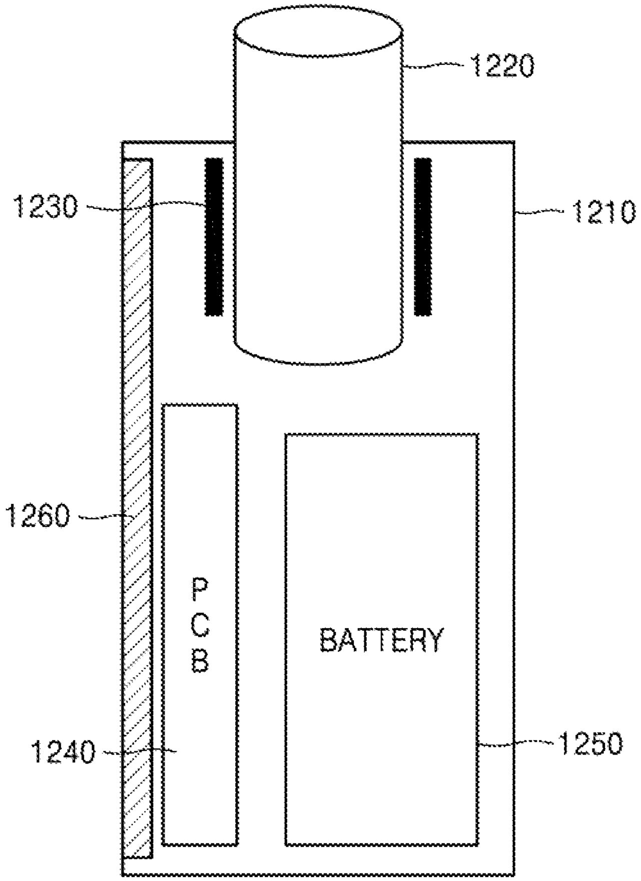
FIG. 13 is a second example view illustrating a position of a multilayered thermally conductive member.
Figure 14:
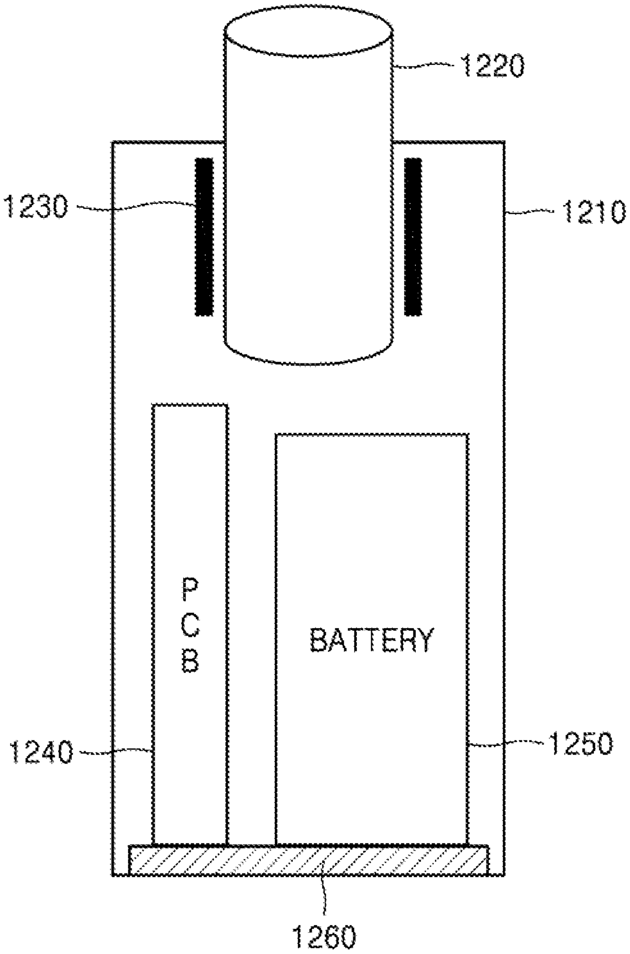
FIG. 14 is a third example view illustrating a position of a multilayered thermally conductive member.

FIGS. 12 to 14 are example views illustrating positions of a multilayered thermally conductive member.

Referring to FIGS. 12 to 14, an aerosol generating device 1210 may include a printed circuit board (PCB) 1240, a battery 1250, a heater 1230, and a multilayered thermally conductive member 1260. However, an internal structure of the aerosol generating device 1210 is not limited to those illustrated in FIGS. 12 to 14. The aerosol generating device 1210, an aerosol generating article 1220, the heater 1230, and the battery 1250 of FIGS. 12 to 14 correspond to the aerosol generating device 1, the aerosol generating article 2, the heater 13, and the battery 11 of FIGS. 1 and 2. Therefore, redundant descriptions thereof will be omitted.

In the aerosol generating device 1210 illustrated in FIGS. 12 and 14, some components related to the present embodiment are illustrated. Therefore, those of ordinary skill in the art related to the present embodiment will understand that general-purpose components other than the components shown in FIGS. 12 and 14 may be further included in the aerosol generating device 1210.

The aerosol generating device 1210 may include a heat generation member and the multilayered thermally conductive member 1260 configured to discharge heat generated from the heat generation member to the outside of the aerosol generating device 1210. The heat generation member is an object that generates heat, and may include the PCB 1240, the battery 1250, or the like. The multilayered thermally conductive member 1260 may refer to a clad metal, ply metals, or the like. However, embodiments of the present disclosure are not limited thereto.

Each layer of the multilayered thermally conductive member 1260 may include a corrosion-resistant material or a thermally conductive material. For example, the multilayered thermally conductive member 1260 may include two layers or three layers, or may include three or more layers, but is not limited thereto. The multilayered thermally conductive member 1260 may include a layer including the corrosion-resistant material and a layer including the thermally conductive material.

According to an embodiment, the multilayered thermally conductive member 1260 may include a first thermally conductive layer facing the heat generation member and including the corrosion-resistant material, a second thermally conductive layer facing the first thermally conductive layer and including the thermally conductive material, and a third thermally conductive layer facing the second thermally conductive layer and including the corrosion-resistant material. Still, either the first thermally conductive layer or the third thermally conductive layer may be omitted in some embodiments.

The multilayered thermally conductive member 1260 and the heat generation member may be in close contact with each other or spaced apart from each other. However, embodiments of the present disclosure are not limited thereto.

According to an embodiment, the corrosion-resistant material included in the first thermally conductive layer and the third thermally conductive layer may be STS series. In addition, the corrosion-resistant material included in the first thermally conductive layer and the third thermally conductive layer may include at least any one of Cr, C, Fe, Mn, Mo, Ni, P, Si, and S.

For example, the first thermally conductive layer or the third thermally conductive layer may include 0.1% or less C, 16% to 20% Cr, 62% to 73.5% Fe, 2% or less Mn, 1% to 2% Mo, 9% to 11.5% Ni, 0.05% or less P, 1.2% or less Si, and 0.05% or less S. However, embodiments of the present disclosure are not limited thereto.

The first thermally conductive layer and the third thermally conductive layer may include materials different from each other or the same material. In addition, contents of the corrosion-resistant material included in the first thermally conductive layer and the third thermally conductive layer may be different from each other. For example, a percentage of components of the first thermally conductive layer containing Fe relative to total components of the first thermally conductive layer may be 65%, and a percentage of components of the third thermally conductive layer containing Fe relative to total components of the third thermally conductive layer may be 70%.

The second thermally conductive layer of the multilayered thermally conductive member 1260 may include a material having a high thermal conductivity. The thermally conductive material may include Cu, Au, Ag, Pt, Al, or an alloy thereof. However, embodiments of the present disclosure are not limited thereto. The alloy may contain 95% or more of a main metal.

According to an embodiment, the second thermally conductive layer may include a plurality of layers, and each of the plurality of layers may include materials different from each other. For example, the second thermally conductive layer may include a layer including Cu and a layer including Al.

The multilayered thermally conductive member 1260 may have a thermal conductivity within a range of 150 W/m·K to 300 W/m·K, and the second thermally conductive layer may have a thermal conductivity within a range of 200 W/m·K to 500 W/m·K. In addition, the first thermally conductive layer and the third thermally conductive layer may have a thermal conductivity within a range of 10 W/m·K to 20 W/m·K. According to embodiments, the thermal conductivity of the first thermally conductive layer and of the third thermally conductive layer is 16.2 W/m·K. However, embodiments of the present disclosure are not limited thereto.

A thickness of the multilayered thermally conductive member 1260 may be within a range of 0.05 mm to 0.25 mm. According to embodiments, the thickness of the multilayered thermally conductive member 1260 is 0.15 mm. However, embodiments of the present disclosure are not limited thereto.

According to an embodiment, a percentage of a thickness of the first thermally conductive layer to the thickness of the multilayered thermally conductive member 1260 may have a value within a range of 15% to 25%, a percentage of a thickness of the second thermally conductive layer to the thickness of the multilayered thermally conductive member 1260 may have a value within a range of 50% to 70%, and a percentage of a thickness of the third thermally conductive layer to the thickness of the multilayered thermally conductive member 1260 may have a value within a range of 15% to 25%. For example, when the thickness of the multilayered thermally conductive member 1260 is 0.2 mm, the thickness of the first thermally conductive layer may be 0.04 mm, the thickness of the second thermally conductive layer may be 0.12 mm, and the thickness of the third thermally conductive layer may be 0.04 mm. However, embodiments of the present disclosure are not limited thereto.

Still, the thickness of the first thermally conductive layer and the thickness of the third thermally conductive layer may be different from each other. For example, when the thickness of the multilayered thermally conductive member

1260 is 0.2 mm, the thickness of the first thermally conductive layer may be 0.03 mm, the thickness of the second thermally conductive layer may be 0.12 mm, and the thickness of the third thermally conductive layer may be 0.05 mm. However, embodiments of the present disclosure are not limited thereto.

The multilayered thermally conductive member 1260 may be arranged at various positions between the heat generation member and a housing of the aerosol generating device 1210.

According to an embodiment, the multilayered thermally conductive member 1260 may be in close contact with at least a portion of the housing of the aerosol generating device 1210, and may be arranged to be in close contact with at least a portion of the heat generation member. For example, the multilayered thermally conductive member 1260 may be arranged to be in close contact with at least a portion of the PCB 1240 or of the battery 1250, and may be arranged to be in close contact with at least a portion of the housing of the aerosol generating device 1210, as shown in FIG. 12. Alternatively, the multilayered thermally conductive member 1260 may be arranged to be in close contact with a front surface of the housing of the aerosol generating device 1210, as shown in FIG. 13. Alternatively, the multilayered thermally conductive member 1260 may be arranged to be in close contact with at least a portion of a lower end of the housing of the aerosol generating device 1210, and may be arranged to be in close contact with at least a portion of the PCB 1240 or of the battery 1250, based on a lengthwise direction of the aerosol generating device 1210, as shown in FIG. 14. Still, arrangements of the multilayered thermally conductive member 1260 are not limited to those shown in FIGS. 12 to 14.

The multilayered thermally conductive member 1260 includes the first thermally conductive layer and the third thermally conductive layer having excellent corrosion resistance and strength, and the second thermally conductive layer having an excellent thermal conductivity. Therefore, heat generated from the heat generation member may be discharged to the outside of the aerosol generating device 1210. Therefore, damage to internal parts of the aerosol generating device 1210 may be prevented, and a particular portion of the aerosol generating device 1210 may not be rapidly heated, thereby increasing user convenience and safety.

Figure 15:
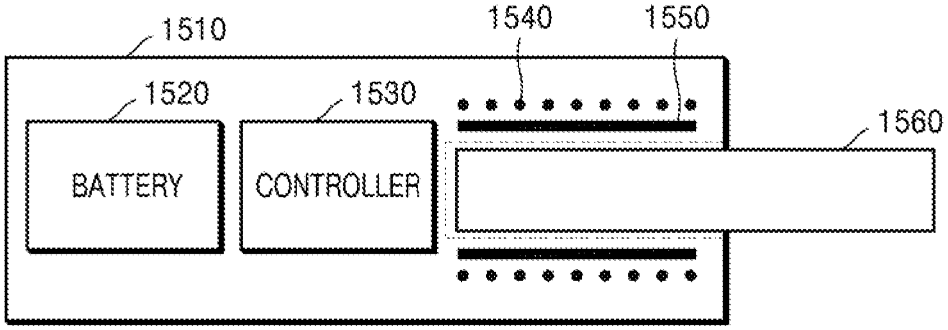
FIG. 15 is a diagram illustrating a configuration of an aerosol generating device, according to another embodiment.

FIG. 15 is a diagram illustrating a configuration of an aerosol generating device, according to another embodiment.

Referring to FIG. 15, an aerosol generating device 1510 may include an accommodation space into which an aerosol generating article 1560 is inserted, and may heat the aerosol generating article 1560 inserted into the accommodation space to generate an aerosol. FIG. 15 illustrates that the aerosol generating device 1510 is used along with the aerosol generating article 1560 for convenience of descriptions, which is merely an example.

The aerosol generating device 1510 may include a battery 1520, a controller 1530, a multilayered thermally conductive member 1550, and a coil 1540. However, an internal structure of the aerosol generating device 1510 is not limited to those illustrated in FIG. 15. Those skilled in the art related to the present embodiment may understand that depending on an embodiment of the aerosol generating device 1510, some of the hardware configurations illustrated in FIG. 15 may be omitted, or a new configuration may be added thereto.

The battery 1520 supplies power used for the aerosol generating device 1510 to operate. For example, the battery 1520 may supply power such that the coil 1540 generates a variable magnetic field. The battery 1520 may also supply power required for other hardware components included within the aerosol generating device 1510, for example, various sensors (not shown), a user interface (not shown), a memory (not shown), and the controller 1530 to operate. The battery 1520 may be a rechargeable battery or a disposable battery. For example, the battery 1520 may be a lithium polymer (LiPoly) battery, but is not limited thereto.

The controller 1530 is hardware configured to control the overall operation of the aerosol generating device 1510. For example, the controller 1530 controls not only operations of the battery 1520, of the multilayered thermally conductive member 1550, and of the coil 1540, but also operations of other components included within the aerosol generating device 1510. In addition, the controller 1530 may check states of each of the components of the aerosol generating device 1510 to determine whether or not the aerosol generating device 1510 is operable.

The controller 1530 may control power supplied from the battery 1520 to the coil 1540 such that the multilayered thermally conductive member 1550 is heated by the variable magnetic field formed by the coil 1540 in order to heat the aerosol generating article 1560.

The controller 1530 includes at least one processor. A processor can be implemented as an array of a plurality of logic gates or can be implemented as a combination of a general-purpose microprocessor and a memory in which a program executable in the microprocessor is stored. In addition, those skilled in the art related to the present embodiment may understand that the processor may be implemented with other types of hardware.

The multilayered thermally conductive member 1550 may include a material configured to be heated as the variable magnetic field is applied, and may serve as a susceptor. The multilayered thermally conductive member 1550 may refer to a clad metal, ply metals, or the like. However, embodiments of the present disclosure are not limited thereto.

Each layer of the multilayered thermally conductive member 1550 may include a corrosion-resistant material or a thermally conductive material. For example, the multilayered thermally conductive member 1550 may include two layers or three layers, or may include three or more layers. However, embodiments of the present disclosure are not limited thereto. The multilayered thermally conductive member 1550 may include a layer including the corrosion-resistant material and a layer including the thermally conductive material.

The multilayered thermally conductive member 1550 may include a first thermally conductive layer facing the accommodation space into which the aerosol generating article 1560 is inserted and including the corrosion-resistant material, a second thermally conductive layer facing the first thermally conductive layer and including the thermally conductive material, and a third thermally conductive layer facing the second thermally conductive layer and including the corrosion-resistant material. Either the first thermally conductive layer or the third thermally conductive layer may be omitted in some embodiments.

According to an embodiment, the corrosion-resistant material included in the first thermally conductive layer and the third thermally conductive layer may be STS series. In addition, the corrosion-resistant material included in the first thermally conductive layer and the third thermally conductive layer may include at least any one of Cr, C, Fe, Mn, Mo, Ni, P, Si, and S.

For example, the first thermally conductive layer and the third thermally conductive layer may include each 0.1% or less C, 16% to 20% Cr, 62% to 73.5% Fe, 2% or less Mn, 1% to 2% Mo, 9% to 11.5% Ni, 0.05% or less P, 1.2% or less Si, and 0.05% or less S. However, embodiments of the present disclosure are not limited thereto.

The first thermally conductive layer and the third thermally conductive layer may include materials different from each other or the same material. In addition, contents of the corrosion-resistant material included in the first thermally conductive layer and the third thermally conductive layer may be different from each other. For example, a percentage of components of the first thermally conductive layer including Cr to total components of the first thermally conductive layer may be 17%, and a percentage of components of the third thermally conductive layer including Cr to total components of the third thermally conductive layer may be 19%. Since the first thermally conductive layer and the third thermally conductive layer contain Cr, C, Fe, etc., corrosion resistance and oxidation resistance may be excellent, and strength may be increased.

The second thermally conductive layer of the multilayered thermally conductive member 1550 may include a material having a high thermal conductivity.

According to an embodiment, the thermally conductive material may include Cu, Au, Ag, Pt, Al, or an ally thereof. However, embodiments of the present disclosure are not limited thereto. The alloy may contain 95% or more of a main metal.

According to an embodiment, the second thermally conductive layer may include a plurality of layers, and each of the plurality of layers may include materials different from each other. For example, the second thermally conductive layer may include a layer including Cu and a layer including Al. Since the second thermally conductive layer includes the thermally conductive material, generated heat may be efficiently transferred to an aerosol generating article 1560.

The multilayered thermally conductive member 1550 may have a thermal conductivity within a range of 150 W/m·K to 300 W/m·K, and the second thermally conductive layer may have a thermal conductivity within a range of 200 W/m·K to 500 W/m·K. In addition, the first thermally conductive layer and the third thermally conductive layer may have each a thermal conductivity within a range of 10 W/m·K to 20 W/m·K. According to embodiments, the thermal conductivity of the first thermally conductive layer or of the third thermally conductive layer is 16.2 W/m·K. However, embodiments of the present disclosure are not limited thereto.

According to an embodiment, a percentage of a thickness of the first thermally conductive layer to a thickness of the multilayered thermally conductive member 1550 may have a value within a range of 15% to 25%, a percentage of a thickness of the second thermally conductive layer to the thickness of the multilayered thermally conductive member 1550 may have a value within a range of 50% to 70%, and a percentage of a thickness of the third thermally conductive layer to the thickness of the multilayered thermally conductive member 1550 may have a value within a range of 15% to 25%. For example, when the thickness of the multilayered thermally conductive member 1550 is 0.15 mm, the thickness of the first thermally conductive layer may be 0.0225 mm, the thickness of the second thermally conductive layer may be 0.105 mm, and the thickness of the third thermally conductive layer may be 0.0225 mm. However, embodiments of the present disclosure are not limited thereto.

In addition, the thickness of the first thermally conductive layer and the thickness of the third thermally conductive layer may be different from each other. For example, when the thickness of the multilayered thermally conductive member 1550 is 0.1 mm, the thickness of the first thermally conductive layer may be 0.015 mm, the thickness of the second thermally conductive layer may be 0.065 mm, and the thickness of the third thermally conductive layer may be 0.02 mm. However, embodiments of the present disclosure are not limited thereto.

The multilayered thermally conductive member 1550 may have a tubular shape or a cylindrical shape, and may be arranged to surround the accommodation space into which the aerosol generating article 1560 is inserted. When the aerosol generating article 1560 is inserted into the accommodation space of the aerosol generating device 1510, the multilayered thermally conductive member 1550 may be arranged to surround the aerosol generating article 1560. Therefore, a temperature of an aerosol generating material in the aerosol generating article 1560 may be increased by heat transferred from the external multilayered thermally conductive member 1550, and an aerosol may be generated.

The multilayered thermally conductive member 1550 may include the first thermally conductive layer and the third thermally conductive layer having excellent corrosion resistance and strength, and the second thermally conductive layer having an excellent thermal conductivity to efficiently heat the aerosol generating article 1560.

The coil 1540 may generate a variable magnetic field as power is supplied from the battery 1520. The variable magnetic field generated by the coil 1540 may be applied to the multilayered thermally conductive member 1550, and accordingly, the multilayered thermally conductive member 1550 may be heated. The power supplied to the coil 1540 may be adjusted under the control of the controller 1530, and a temperature at which the multilayered thermally conductive member 1550 is heated may be appropriately maintained.

The aerosol generating device 1510 may further include general-purpose components other than the battery 1520, the controller 1530, the coil 1540, and the multilayered thermally conductive member 1550. For example, the aerosol generating device 10 may further include a cigarette insertion detection sensor, other sensors (e.g., a temperature detection sensor, a puff detection sensor, etc.), a user interface, and a memory.

The user interface may provide a user with information on a state of the aerosol generating device 1510. The user interface may include a display or lamp for outputting visual information, a motor for outputting tactile information, a speaker for outputting sound information, an input/output (I/O) interfacing means (e.g., button or touch screen) for receiving information input from the user or outputting information to the user. The user interface may also include various interfacing means such as terminals for data communication or for receiving charging power, a communication interfacing module for performing wireless communication with an external device (e.g., wireless fidelity (Wi-Fi), Wi-Fi direct, blue-tooth, near-field communication (NFC)), and the like.

Still, only some of the various user interface examples illustrated above may be selected to be implemented within the aerosol generating device 1510. Alternatively, at least some of the various user interface examples illustrated above may be combined to be implemented within the aerosol generating device 1510. For example, the aerosol generating device 1510 may include a touch screen display capable of receiving a user input while outputting visual information on a front side. The touch screen display may include a fingerprint sensor, and user authentication may be performed by the fingerprint sensor.

The memory is hardware that stores various types of data processed within the aerosol generating device 1510, and the memory may store data processed by the controller 1530 and data to be processed by the controller 1530. The memory may be implemented by a variety of types, such as random access memory (RAM) such as dynamic random access memory (DRAM), static random access memory (SRAM), and the like, read-only memory (ROM), electrically erasable programmable read-only memory (EEPROM), and the like.

The memory may store an operation time of the aerosol generating device 1510, a maximum number of puffs, a current number of puffs, at least one temperature profile, data on the user's smoking pattern, and the like.

The descriptions of the above-described embodiments are merely examples, and it will be understood by one of ordinary skill in the art that various changes and equivalents thereof may be made.

The invention claimed is:

1. An aerosol generating device comprising:

a multilayered thermally conductive member forming an accommodation space into which an aerosol generating article is configured to be inserted, wherein the multilayered thermally conductive member is configured to surround at least a portion of the aerosol generating article in a case where the aerosol generating article is inserted into the accommodation space;

a heater surrounding the multilayered thermally conductive member;

a battery configured to supply power to the heater; and a controller configured to control power supplied from the battery to the heater such that the multilayered thermally conductive member transfers heat from the heater to the aerosol generating article, wherein the multilayered thermally conductive member is configured to transmit heat generated from the heater to the aerosol generating article, and wherein the multilayered thermally conductive member comprises at least two layers, wherein the at least two layers comprise a first layer comprising a corrosion-resistant material, and a second layer comprising a thermally conductive material.

2. The aerosol generating device of claim 1, wherein the at least two layers of the multilayered thermally conductive member comprise:

the first layer, the first layer being a first thermally conductive layer facing the accommodation space and comprising the corrosion-resistant material;

the second layer, the second layer being a second thermally conductive layer facing the first thermally conductive layer and comprising the thermally conductive material; and a third thermally conductive layer arranged between the second thermally conductive layer and the heater, and comprising the corrosion-resistant material.

3. The aerosol generating device of claim 1, wherein a thickness of the multilayered thermally conductive member is within a range of 0.05 mm to 0.25 mm.

4. The aerosol generating device of claim 2, wherein a percentage of a thickness of the first thermally conductive layer to a total thickness of the multilayered thermally conductive member has a value within a range of 15% to 25%, a percentage of a thickness of the second thermally conductive layer to the total thickness of the multilayered thermally conductive member has a value within a range of 50% to 70%, and a percentage of a thickness of the third thermally conductive layer to the total thickness of the multilayered thermally conductive member has a value within a range of 15% to 25%.

5. The aerosol generating device of claim 1, wherein the corrosion-resistant material is stainless steel (STS) series.

6. The aerosol generating device of claim 1, wherein the thermally conductive material comprises copper (Cu), gold (Au), silver (Ag), platinum (Pt), aluminum (Al), or an alloy thereof.

7. The aerosol generating device of claim 1, wherein the multilayered thermally conductive member has a thermal conductivity within a range of 150 W/m·K to 300 W/m·K.

8. The aerosol generating device of claim 2, wherein the first thermally conductive layer and the third thermally conductive layer have a thermal conductivity within a range of 10 W/m·K to 20 W/m·K, and the second thermally conductive layer has a thermal conductivity within a range of 200 W/m·K to 500 W/m·K.

9. The aerosol generating device of claim 1, wherein the heater comprises:

a susceptor; and a coil configured to form a variable magnetic field in the susceptor.

10. The aerosol generating device of claim 1, wherein the heater comprises a coil configured to form a variable magnetic field in the multilayered thermally conductive member, and the multilayered thermally conductive member serves as a susceptor, and is configured to be heated by the variable magnetic field formed by the coil.

11. The aerosol generating device of claim 1, further comprising an insulation material surrounding the heater.

12. The aerosol generating device of claim 11, wherein the insulation material has a thermal conductivity of 0.025 W/m·K or less.

13. The aerosol generating device of claim 1, wherein the aerosol generating article is a cigarette.

14. An aerosol generating device comprising:

a heat generation member; and a multilayered thermally conductive member configured to discharge heat generated from the heat generation member to an outside of the aerosol generating device, wherein the multilayered thermally conductive member is located outside of the heat generation member, and wherein the multilayered thermally conductive member comprises at least two layers, where the at least two layers comprise a first layer comprising a corrosion-resistant material, and a second layer comprising a thermally conductive material.

15. The aerosol generating device of claim 14, wherein the at least two layers of the multilayered thermally conductive member comprise:

the first layer, the first layer being a first thermally conductive layer facing the heat generation member and comprising the corrosion-resistant material;

the second layer, the second layer being a second thermally conductive layer facing the first thermally conductive layer and comprising the thermally conductive material; and a third thermally conductive layer facing the second thermally conductive layer and comprising the corrosion-resistant material.

16. The aerosol generating device of claim 14, wherein the heat generation member comprises a printed circuit board (PCB) or a battery.

* * * * *